United States Patent
Kim et al.

(10) Patent No.: US 8,760,436 B2
(45) Date of Patent: Jun. 24, 2014

(54) MUTUAL CAPACITIVE TOUCH PANEL

(71) Applicant: Samsung Electro-Mechanics Co., Ltd., Gyunggi-do (KR)

(72) Inventors: Woon Chun Kim, Gyunggi-do (KR); Jong Young Lee, Gyunggi-do (KR); Kyoung Soo Chae, Gyunggi-do (KR); Yong Soo Oh, Seongnam-si (KR)

(73) Assignee: Samsung Electro-Mechanics Co., Ltd., Gyunggi (KR)

( * ) Notice: Subject to any disclaimer, the term of this patent is extended or adjusted under 35 U.S.C. 154(b) by 0 days.

(21) Appl. No.: 13/935,461

(22) Filed: Jul. 3, 2013

(65) Prior Publication Data

US 2013/0293512 A1    Nov. 7, 2013

Related U.S. Application Data

(63) Continuation of application No. 12/818,909, filed on Jun. 18, 2010, now abandoned.

(30) Foreign Application Priority Data

Mar. 29, 2010 (KR) ........................ 10-2010-0028067

(51) Int. Cl.
*G06F 3/044* (2006.01)
(52) U.S. Cl.
USPC ............. 345/174; 345/173; 345/98; 345/100; 345/76; 345/77
(58) Field of Classification Search
None
See application file for complete search history.

(56) References Cited

U.S. PATENT DOCUMENTS

| | | | | | |
|---|---|---|---|---|---|
| 3,989,355 | A | * | 11/1976 | Wilmer | 349/77 |
| 5,969,478 | A | * | 10/1999 | Shino et al. | 315/169.4 |
| 6,054,974 | A | * | 4/2000 | Sakai et al. | 345/98 |
| 6,091,382 | A | * | 7/2000 | Shioya et al. | 345/76 |
| 6,118,220 | A | * | 9/2000 | Shino et al. | 315/169.4 |
| 6,876,349 | B2 | * | 4/2005 | Edwards et al. | 345/92 |
| 8,199,137 | B2 | * | 6/2012 | Ishii et al. | 345/204 |
| 8,199,139 | B2 | * | 6/2012 | Okazaki et al. | 345/204 |
| 2008/0239174 | A1 | * | 10/2008 | Ishii et al. | 349/12 |
| 2011/0017281 | A1 | * | 1/2011 | Funakoshi et al. | 136/251 |
| 2011/0025636 | A1 | * | 2/2011 | Ryu et al. | 345/173 |
| 2011/0099805 | A1 | * | 5/2011 | Lee | 29/846 |
| 2011/0109583 | A1 | * | 5/2011 | Lee | 345/174 |

* cited by examiner

*Primary Examiner* — Van Chow
(74) *Attorney, Agent, or Firm* — Bracewell & Giuliani LLP; Brady Y. Chin

(57) ABSTRACT

Disclosed herein is a mutual capacitive touch panel, including: a first transparent substrate; a first bar-shaped transparent electrode formed on the first transparent substrate and divided in a length direction; first wiring whose one set of ends are connected to the first bar-shaped transparent electrode and whose the other set of ends are arranged on one side of the first transparent substrate; a second transparent substrate; a second bar-shaped transparent electrode formed on the second transparent substrate and divided in a length direction; second wiring whose one set of ends are connected to the second bar-shaped to transparent electrode and whose the other set of ends are arranged on one side of the second transparent substrate; and an adhesive layer disposed between the first bar-shaped transparent electrode and the second bar-shaped transparent electrode such that the first bar-shaped transparent electrode and the second bar-shaped transparent electrode face each other. The mutual capacitive touch panel is advantageous in that, since transparent electrodes are divided, low resistance can be realized even when the transparent electrodes are made of a conductive polymer, thus keeping up with the trend of manufacturing large touch panels.

13 Claims, 9 Drawing Sheets

MUTUAL CAPACITIVE TOUCH PANEL

CROSS REFERENCE TO RELATED APPLICATION

This application is a continuation of U.S. patent application Ser. No. 12/818,909, filed Jun. 18, 2010 entitled "MUTUAL CAPACITIVE TOUCH PANEL" which claims the benefit of Korean Patent Application No. 10-2010-0028067, filed Mar. 29, 2010, entitled "Mutual capacitive type touch panel", which was incorporated by reference.

BACKGROUND OF THE INVENTION

1. Technical Field

The present invention relates to a mutual capacitive touch panel.

2. Description of the Related Art

Development of computer peripherals has occurred alongside that of computers using digital technology. Personal computers, portable transmitters and other information equipment conduct text processing and graphic processing using such various input devices as keyboards, mice and the like.

With the rapid progress of the information society, the application of computers is expanding. However, there is a problem in that it is difficult to efficiently operate computers using keyboards and mice as input devices. Therefore, it is required to develop input devices which are easy to operate, which do not malfunction, and by which data can be easily input by users.

Further, input devices are required to have high reliability, durability, originality, design and machinability as well as satisfy general functions. For this reason, a touch panel, which is an input device capable of inputting textual information, graphic information and the like, was developed.

The touch panel is provided on the display surface of electronic organizers, liquid crystal displays (LCDs), plasma display panels (PDPs), electroluminescent displays (ELDs), cathode ray tubes (CRT) and the like, and is used to allow users to select desired information.

Touch panels are classified into resistive touch panels, capacitive touch panels, electromagnetic touch panels, surface acoustic wave (SAW) type touch panels, and infrared touch panels. These various touch panels are employed in electronic products in consideration of the problem of signal amplification, a difference in resolution, difficulties in design and machining technologies, optical characteristics, electrical characteristics, mechanical characteristics, environmental characteristics, input characteristics, durability and economic efficiency. Among these various touch panels, resistive touch panels and capacitive touch panels are the most widely used. Among them, capacitive touch panels have lately attracted considerable attention because they have high transmissivity and durability.

In a conventional capacitive touch panel, a transparent electrode is formed over the entire surface of a transparent substrate or is patterned in one direction. Therefore, the conventional capacitive touch panel is problematic in that the resistance of the transparent electrode is excessively increased when the transparent electrode is made of a conductive polymer having relatively high surface resistance. In conclusion, there is a problem in that the conductive polymer cannot be used to manufacture a large size touch screen and thus cannot be used as a raw material of the transparent electrode because the conductive polymer has excessively high surface resistance even though it has excellent flexibility and processability compared to indium tin oxide (ITO).

SUMMARY OF THE INVENTION

Accordingly, the present invention has been made to solve the above-mentioned problems, and the present invention provides a touch panel whose transparent electrode can be made of a conductive polymer by decreasing the resistance of the transparent electrode using a divided transparent electrode.

A first aspect of the present invention provides a mutual capacitive touch panel, including: a first transparent substrate; a first bar-shaped transparent electrode formed on the first transparent substrate and divided in a length direction; first wiring whose one set of ends are connected to the first bar-shaped transparent electrode and whose the other set of ends are arranged on one side of the first transparent substrate; a second transparent substrate; a second bar-shaped transparent electrode formed on the second transparent substrate and divided in a length direction; second wiring whose one set of ends are connected to the second bar-shaped transparent electrode and whose the other set of ends are arranged on one side of the second transparent substrate; and an adhesive layer disposed between the first bar-shaped transparent electrode and the second bar-shaped transparent electrode such that the first bar-shaped transparent electrode and the second bar-shaped transparent electrode face each other.

Here, the first bar-shaped transparent electrode or the second bar-shaped transparent electrode may be divided into two equal parts.

Further, the first bar-shaped transparent electrode and the second bar-shaped transparent electrode may be perpendicular to each other.

Further, the first bar-shaped transparent electrode or the second bar-shaped transparent electrode may be made of a conductive polymer.

Further, the first bar-shaped transparent electrode or the second bar-shaped transparent electrode may be made of a combination of a conductive polymer and a carbon material.

Further, the carbon material may be selected from among carbon black, carbon nanotubes, and graphene.

A second aspect of the present invention provides a mutual capacitive touch panel, including: a first transparent substrate; a first bar-shaped transparent electrode formed on the first transparent substrate and including a first bar-shaped pattern disposed on the center of the first transparent substrate and second bar-shaped patterns disposed on both sides of the first bar-shaped pattern, the second bar-shaped patterns being perpendicular to the first bar-shaped pattern; first wiring whose one set of ends are connected to the first bar-shaped transparent electrode and whose the other set of ends are arranged on one side of the first transparent substrate; a second transparent substrate; a second bar-shaped transparent electrode formed on the second transparent substrate and including a third bar-shaped to pattern disposed on the center of the second transparent substrate and fourth bar-shaped patterns disposed on both sides of the third bar-shaped pattern, the fourth bar-shaped patterns being perpendicular to the third bar-shaped pattern; second wiring whose one set of ends are connected to the second bar-shaped transparent electrode and whose the other set of ends are arranged on one side of the second transparent substrate; and an adhesive layer disposed between the first bar-shaped transparent electrode and the second bar-shaped transparent electrode such that the first bar-shaped transparent electrode and the second bar-shaped transparent electrode face each other.

Here, the first bar-shaped pattern or the third bar-shaped pattern may be divided into two equal parts in a length direction.

Further, the first bar-shaped transparent electrode or the second bar-shaped transparent electrode may be made of a conductive polymer.

Further, the first bar-shaped transparent electrode or the second bar-shaped transparent electrode may be made of a combination of a conductive polymer and a carbon material.

Further, the carbon material may be selected from among carbon black, carbon nanotubes, and graphene.

A third aspect of the present invention provides a mutual capacitive touch panel, including: a first transparent substrate; a first integrated transparent electrode formed on the first transparent substrate and divided in a length direction; first wiring whose one set of ends are connected to the first integrated transparent electrode and whose the other set of ends are arranged on one side of the first transparent substrate; a second transparent substrate; a second integrated transparent electrode formed on the second transparent substrate and divided in a thickness direction; second wiring whose one set of ends are connected to the second integrated transparent electrode and whose the other set of ends are arranged on one side of the second transparent substrate; and an adhesive layer disposed between the first integrated transparent electrode and the second integrated transparent to electrode such that the first integrated transparent electrode and the second integrated transparent electrode face each other.

Here, the first integrated transparent electrode or the second integrated transparent electrode may be divided into two equal parts.

Further, the first integrated transparent electrode or the second integrated transparent electrode may be divided into three equal parts.

Further, the first integrated transparent electrode and the second integrated transparent electrode may be perpendicular to each other.

Further, the first integrated transparent electrode or the second integrated transparent electrode may be made of a conductive polymer.

Further, the first integrated transparent electrode or the second integrated transparent electrode may be made of a combination of a conductive polymer and a carbon material.

Further, the carbon material may be selected from among carbon black, carbon nanotubes, and graphene.

Various objects, advantages and features of the invention will become apparent from the following description of embodiments with reference to the accompanying drawings The terms and words used in the present specification and claims should not be interpreted as being limited to typical meanings or dictionary definitions, but should be interpreted as having meanings and concepts relevant to the technical scope of the present invention based on the rule according to which an inventor can appropriately define the concept of the term to describe the best method he or she knows for carrying out the invention.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
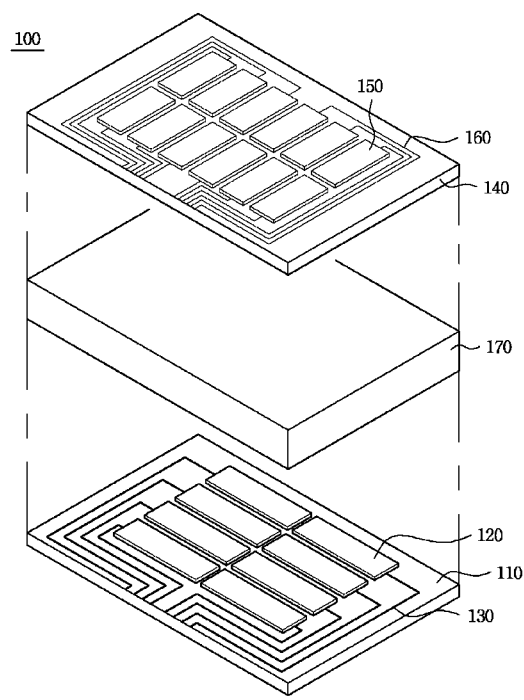
FIG. 1 is an exploded perspective view of a touch panel according to a first embodiment of the present invention.

The objects, features and advantages of the present invention will be more clearly understood from the following detailed description and preferred embodiments taken in conjunction with the accompanying drawings. Throughout the accompanying drawings, to the same reference numerals are used to designate the same or similar components, and redundant descriptions thereof are omitted. Further, in the following description, the terms "first," "second," "one side," "the other side," and the like are used to differentiate a certain component from other components, but the configuration of such components should not be construed to be limited by the terms. Further, in the description of the present invention, when it is determined that the detailed description of the related art would obscure the gist of the present invention, the description thereof will be omitted.

Hereinafter, preferred embodiments of the present invention will be described in detail with reference to the attached drawings.

Figure 2:
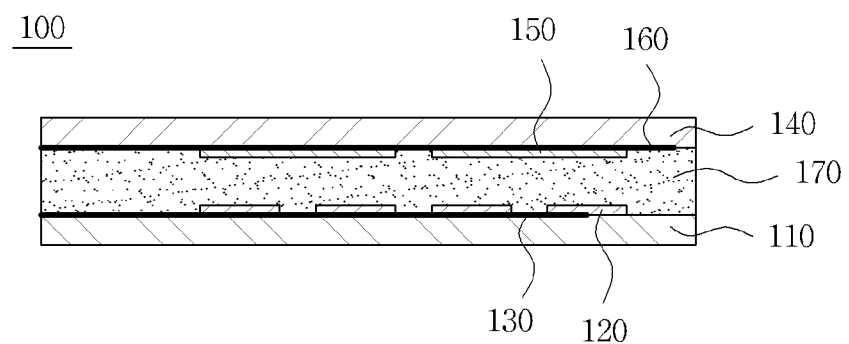
FIG. 2 is a side view of a touch panel according to a first embodiment of the present invention.
Figure 3:
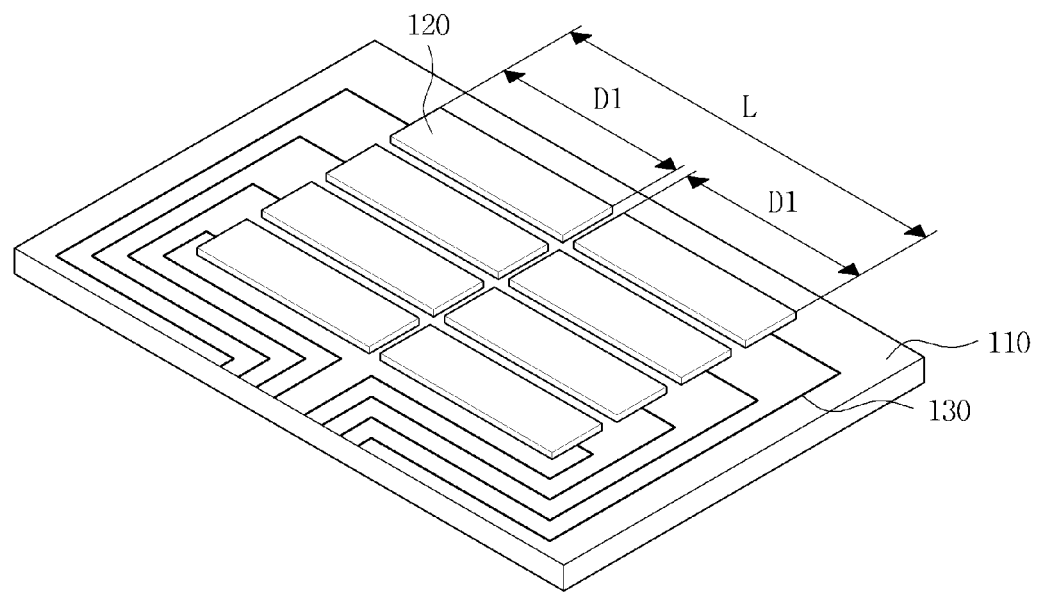
FIG. 3 is a perspective view of a first transparent substrate according to a first embodiment of the present invention.

FIG. 1 is an exploded perspective view of a touch panel according to a first embodiment of the present invention, FIG. 2 is a side view of a touch panel according to a first embodiment of the present invention, and FIG. 3 is a perspective view of a first transparent substrate according to a first embodiment of the present invention.

As shown in FIGS. 1 to 3, the touch panel 100 according to this embodiment includes: a first transparent substrate 110; a first bar-shaped transparent electrode 120 formed on the first transparent substrate 110 and divided in a length direction (L); first wiring 130 whose one set of ends are connected to the first bar-shaped transparent electrode 120 and whose the other set of ends are arranged on one side of the first transparent substrate 110; a second transparent substrate 140; a second bar-shaped transparent electrode 150 formed on the second transparent substrate 140 and divided in a length direction (L); second wiring 160 whose one set of ends are connected to the second bar-shaped transparent electrode 150 and whose the other set of ends are arranged on one side of the second transparent substrate 140; and an adhesive layer 170 disposed between the first bar-shaped transparent electrode 120 and the second bar-shaped transparent electrode 150 such that the first bar-shaped transparent electrode 120 and the second bar-shaped transparent electrode 150 face each other.

The first bar-shaped transparent electrode 120 serves to recognize a user's touch using the mutual capacitance between the first bar-shaped transparent electrode 120 and the second bar-shaped transparent electrode 150, and is formed on the first transparent substrate 110. Here, the first bar-shaped transparent electrode 120 may be made of a conductive polymer having excellent flexibility and coatability or may be made of a combination of a conductive polymer and a carbon material. In this case, examples of the conductive polymer include poly-3,4-ethylenedioxythiophene/polystyrene sulfonate (PEDOT/PSS), polyaniline, polyacetylene, and polyphenylenevinylene, and examples of the carbon material include carbon black, carbon nanotubes, and graphene. However, the kinds of the conductive polymer and the carbon material are not limited thereto, and all conductive polymers and carbon materials well known in the art may be used.

Further, since the first bar-shaped transparent electrode 120 is divided in a length direction (refer to FIG. 3), resistance necessary for driving the touch panel 100 can be realized even when the first bar-shaped transparent electrode 120 is made of a conductive polymer having relatively high surface resistance. In this case, the first bar-shaped transparent electrode 120 may be divided into two equal parts, each having a length of D1, in order to allow the first bar-shaped transparent electrode 120 to realize constant resistance.

Meanwhile, the first transparent substrate 110 formed thereon with the first bar-shaped transparent electrode 120 may be made of polyethylene terephthalate (PET), polycarbonate (PC), polymethylmethacrylate (PMMA), polyethylene naphthalate (PEN), polyether sulfone (PES), cycloolefin copolymer (COC), triacetylcellulose (TAC) film, polyvinyl alcohol (PVA) film, polyimide (PI) film, polystyrene (PS), K-resin-containing biaxially-oriented polystyrene (BOPS), glass, reinforced glass or the like. However, the raw material of the first transparent substrate 110 is not limited thereto.

The first wiring 130 serves to transfer the signals generated from the first bar-shaped transparent electrode 120 to flexible printing cables. One set of ends of the first wiring 130 are connected to the first bar-shaped transparent electrode 120, and the other set of ends thereof are arranged on one side of the first transparent substrate 110. Here, the first wiring 130 may be formed using a silk screen method, a gravure printing method or an ink-jet printing method. Further, the first wiring 130 may be made of a high-conductivity material such as silver (Ag) paste or organic silver (Ag), a conductive polymer, carbon black, carbon nanotubes (CNTs), metal oxide such as indium tin oxide (ITO), or a low-resistance metal.

The second bar-shaped transparent electrode 150, as described above, serves to recognize a user's touch using the mutual capacitance between the second bar-shaped transparent electrode 150 and the first bar-shaped transparent electrode 120, and is formed on the first transparent substrate 110 such that it faces the first bar-shaped transparent electrode 120. In this case, in order to exactly recognize coordinates, the second bar-shaped transparent electrode 150 and the first bar-shaped transparent electrode 120 may be perpendicular to each other. Meanwhile, detailed description of the fact that the second bar-shaped transparent electrode 150 is divided in a length (L) direction and is made of a conductive polymer will be omitted because this description overlaps with the above description of the first bar-shaped transparent electrode 120.

The second wiring 160 serves to transfer the signals generated from the second bar-shaped transparent electrode 150 to flexible printing cables. One set of ends of the second wiring 160 are connected to the second bar-shaped transparent electrode 150, and the other set of ends thereof are arranged on one side of the second transparent substrate 140.

The formation method and raw material of the second wiring 160 are the same as those of the first wiring 130.

The adhesive layer 170 serves to attach the first bar-shaped transparent electrode 120 and the second bar-shaped transparent electrode 150 to each other and simultaneously insulate them from each other. Here, the raw material of the adhesive layer 170 is not particularly limited, but, in order to improve the transparency of the touch panel 100, an optical clear adhesive (OCA) may be used as the raw material of the adhesive layer 170.

Figure 4:
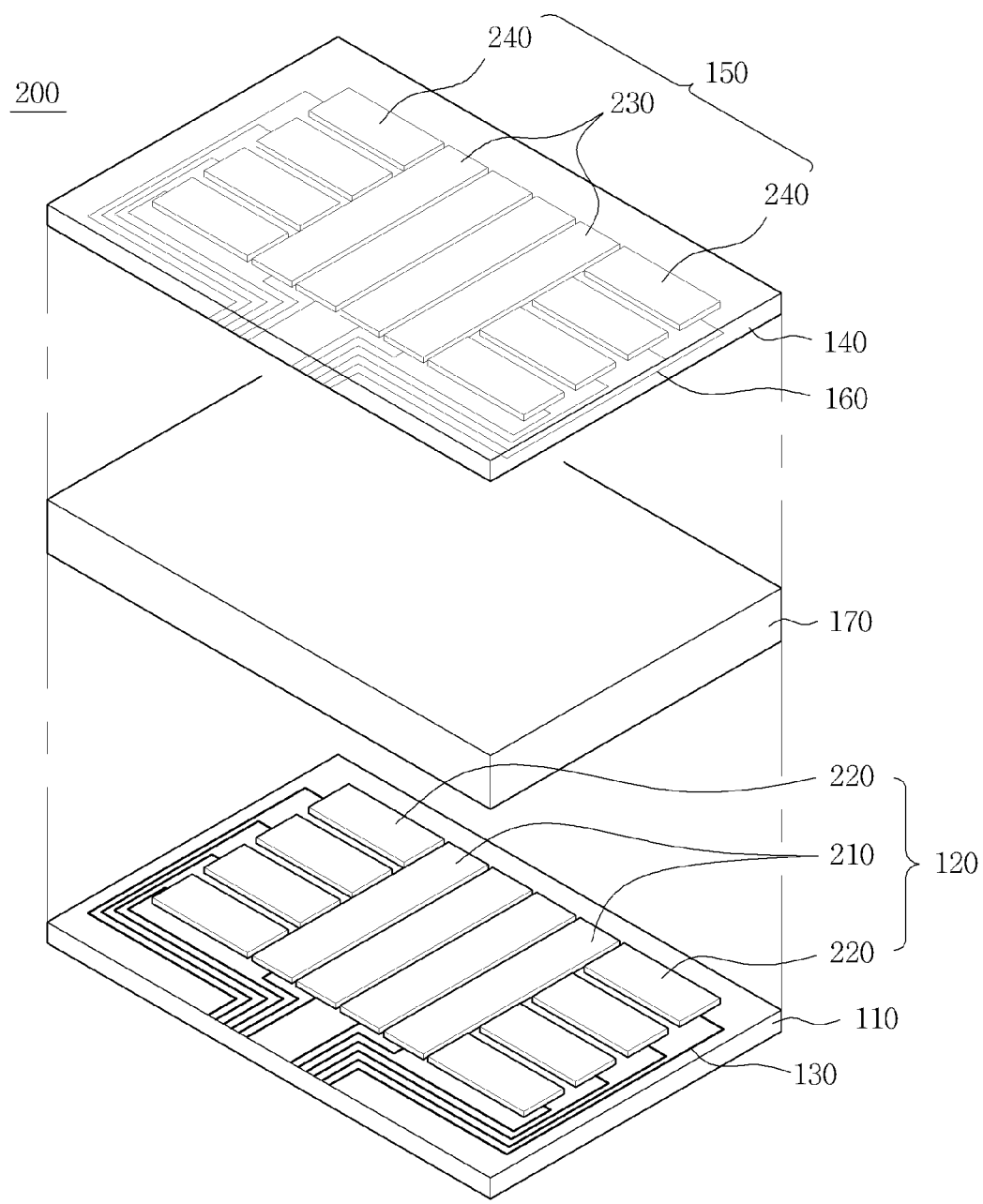
FIG. 4 is an exploded perspective view of a touch panel according to a second embodiment of the present invention.
Figure 5:
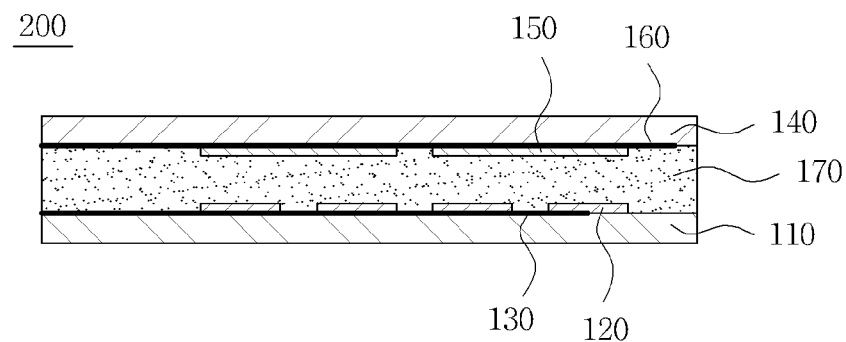
FIG. 5 is a side view of a touch panel according to a second embodiment of the present invention.
Figure 6:
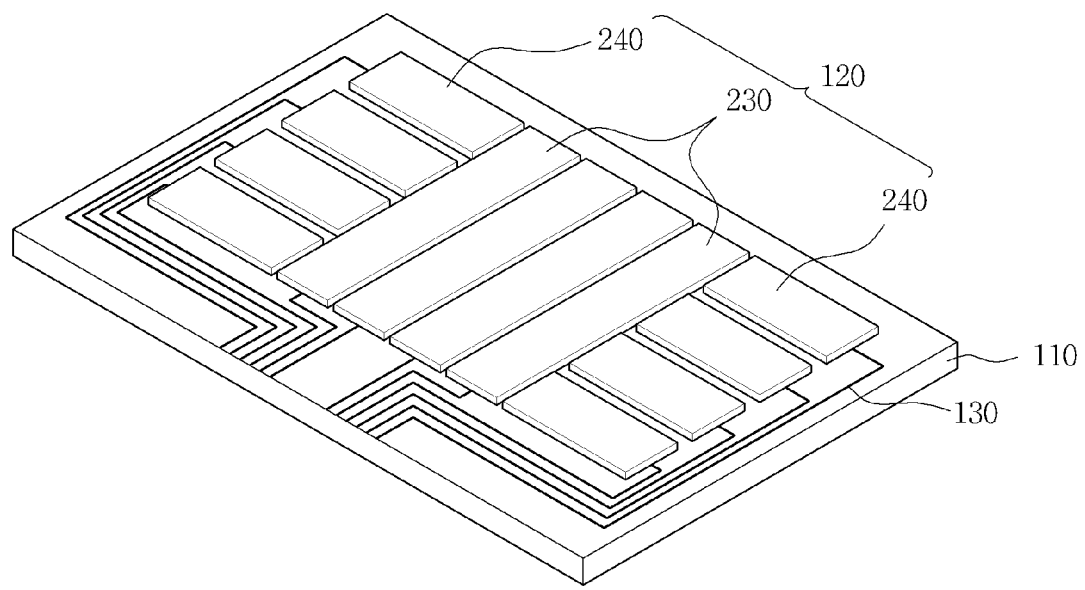
FIGS. 6 and 7 are perspective views of first transparent substrates according to a second embodiment of the present invention.
Figure 7:
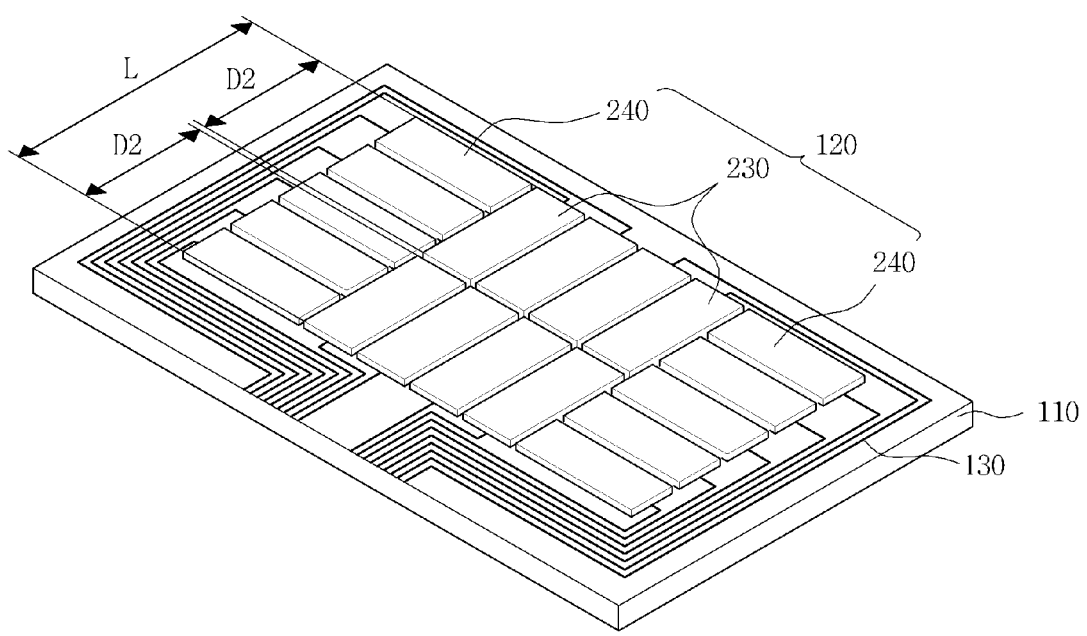

FIG. 4 is an exploded perspective view of a touch panel according to a second embodiment of the present invention, FIG. 5 is a side view of a touch panel according to a second embodiment of the present invention, and FIGS. 6 and 7 are perspective views of first transparent substrates according to a second embodiment of the present invention As shown in FIGS. 4 to 7, the touch panel 200 according to this embodiment includes: a first transparent substrate 110; a first bar-shaped transparent electrode 120 formed on the first transparent substrate 110 and including a first bar-shaped pattern 210 disposed on the center of the first transparent substrate 110 and second bar-shaped patterns 220 disposed on both sides of the first bar-shaped pattern 210, the second bar-shaped patterns 220 being perpendicular to the first bar-shaped pattern 210; first wiring 130 whose one set of ends are connected to the first bar-shaped transparent electrode 120 and whose the other set of ends are arranged on one side of the first transparent substrate 110; a second transparent substrate 140; a second bar-shaped transparent electrode 150 formed on the second transparent substrate 140 and including a third bar-shaped pattern 230 disposed on the center of the second transparent substrate 140 and fourth bar-shaped patterns 240 disposed on both sides of the third bar-shaped pattern 230, the fourth bar-shaped patterns 240 being perpendicular to the third bar-shaped pattern 230; second wiring 160 whose one set of ends are connected to the second bar-shaped transparent electrode 150 and whose the other set of ends are arranged on one side of the second transparent substrate 140; and an adhesive layer 170 disposed between the first bar-shaped transparent electrode 120 and the second bar-shaped transparent electrode 150 such that the first bar-shaped transparent electrode 120 and the second bar-shaped transparent electrode 150 face each other.

The touch panel 200 according to this embodiment is different from the touch panel according to the above first embodiment in the structures of the first bar-shaped transparent electrode 120 and the second bar-shaped transparent electrode 150. Therefore, only the first bar-shaped transparent electrode 120 and the second bar-shaped transparent electrode 150 will be described, and description of other constituents will be omitted.

The first bar-shaped transparent electrode 120 includes a first bar-shaped pattern 210 and second bar-shaped patterns 220. Here, the first bar-shaped pattern 210 is disposed to at the center of the first transparent substrate 110 and the second bar-shaped patterns 220 are disposed on both sides of the first bar-shaped pattern 210. The second bar-shaped patterns 220 are perpendicular to the first bar-shaped pattern 210. Owing to such a configuration, the first bar-shaped pattern 210 can be maximally divided to decrease the resistance of the first bar-shaped pattern 210, and the length of the first wiring 130 connected to the first bar-shaped pattern 210 can be minimized to decrease the resistance of the first wiring 130.

Meanwhile, the first bar-shaped pattern 210 may be longitudinally divided into two equal parts, each having a length of D2 (refer to FIG. 7). In this case, since the resistance of the first bar-shaped pattern 21 can be further decreased, it can keep up with the trend of manufacturing large touch panels.

The structure of the second bar-shaped transparent electrode 150 is basically identical to that of the first bar-shaped transparent electrode 120. Concretely, the second bar-shaped transparent electrode 150 includes a third bar-shaped pattern 230 and fourth bar-shaped patterns 240. The third bar-shaped pattern 230 is disposed on the center of the second transparent substrate 140, and the fourth bar-shaped patterns 240 are disposed on both sides of the third bar-shaped pattern 230. Here, the fourth bar-shaped patterns 240 are perpendicular to the third bar-shaped pattern 230. Further, the third bar-shaped pattern 230, like the first bar-shape pattern 210, may be divided into two equal parts in a length direction.

Further, the first bar-shaped transparent electrode 120 and the second bar-shaped transparent electrode 150, as in the touch panel according to the first embodiment, may be made of a conductive polymer or may be made of a combination of a conductive polymer and a carbon material. Here, examples of the conductive polymer include poly-3,4-ethylenedioxythiophene/polystyrene sulfonate (PEDOT/PSS), polyaniline, polyacetylene, and polyphenylenevinylene, and examples of the carbon material include carbon black, carbon nanotubes, and graphene.

Figure 8:
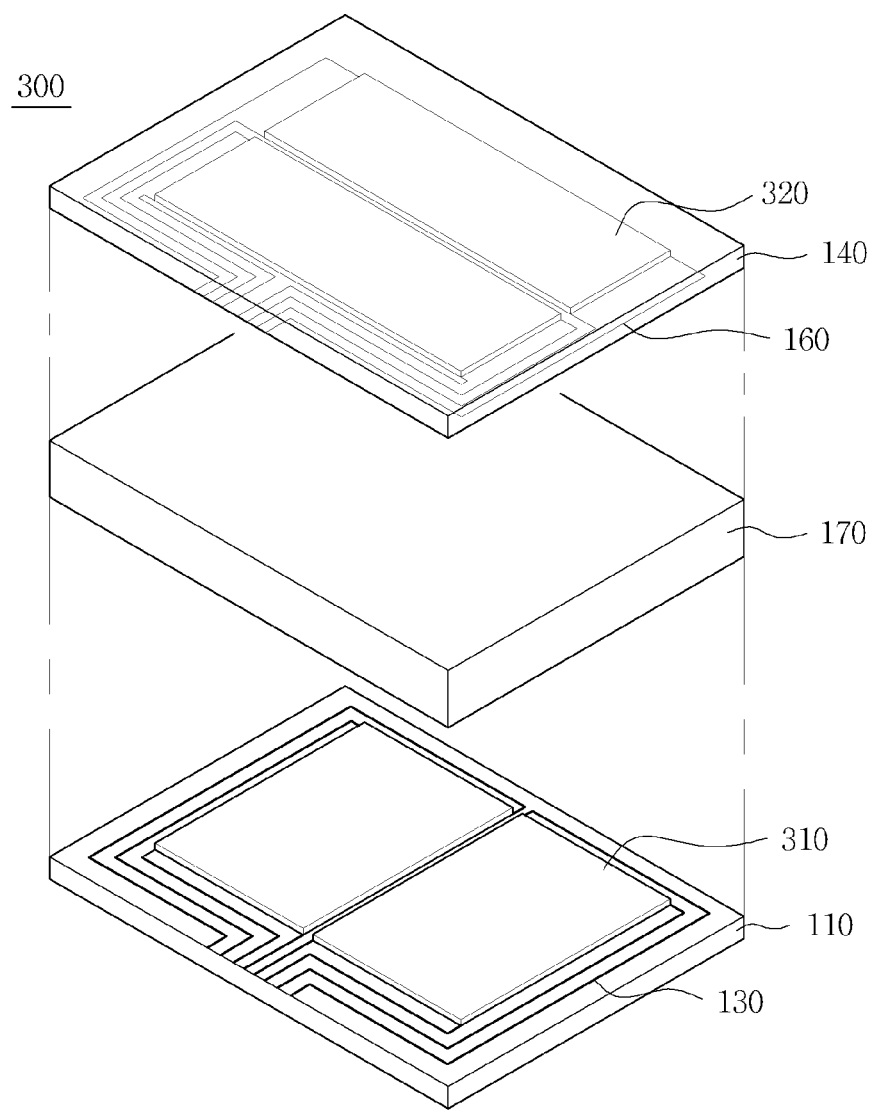
FIG. 8 is an exploded perspective view of a touch panel according to a third embodiment of the present invention.
Figure 9:
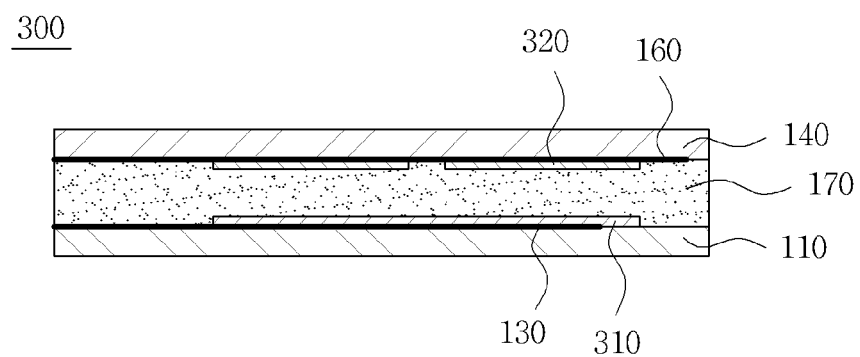
FIG. 9 is a side view of a touch panel according to a third embodiment of the present invention.
Figure 10:
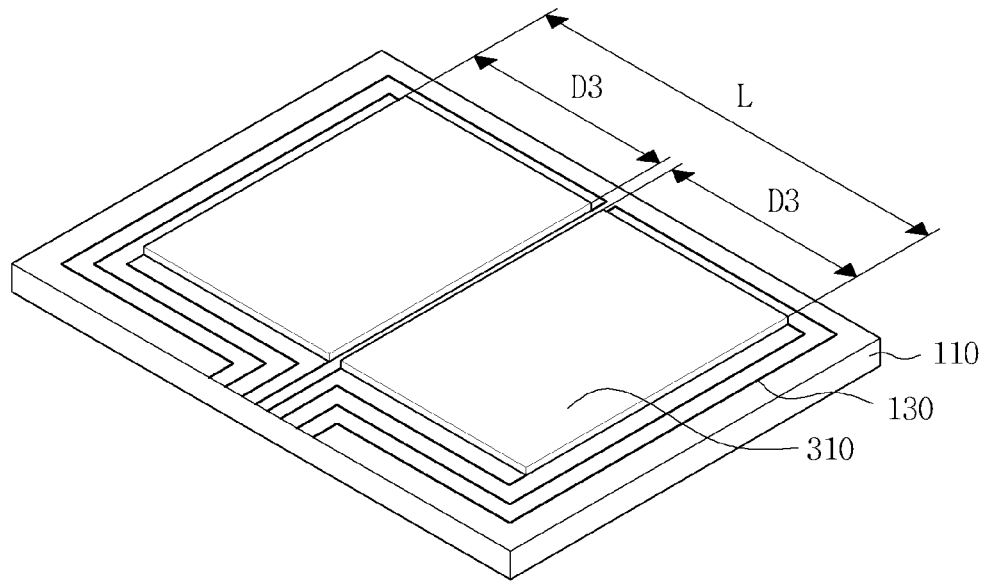
FIGS. 10 and 11 are perspective views of first transparent substrates according to a third embodiment of the present invention.
Figure 11:
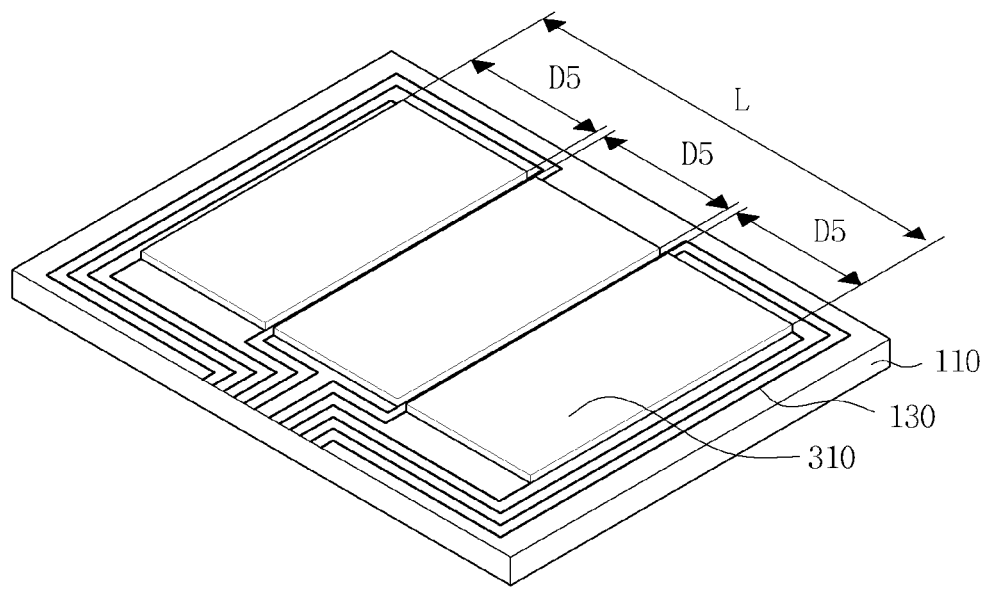
Figure 12:
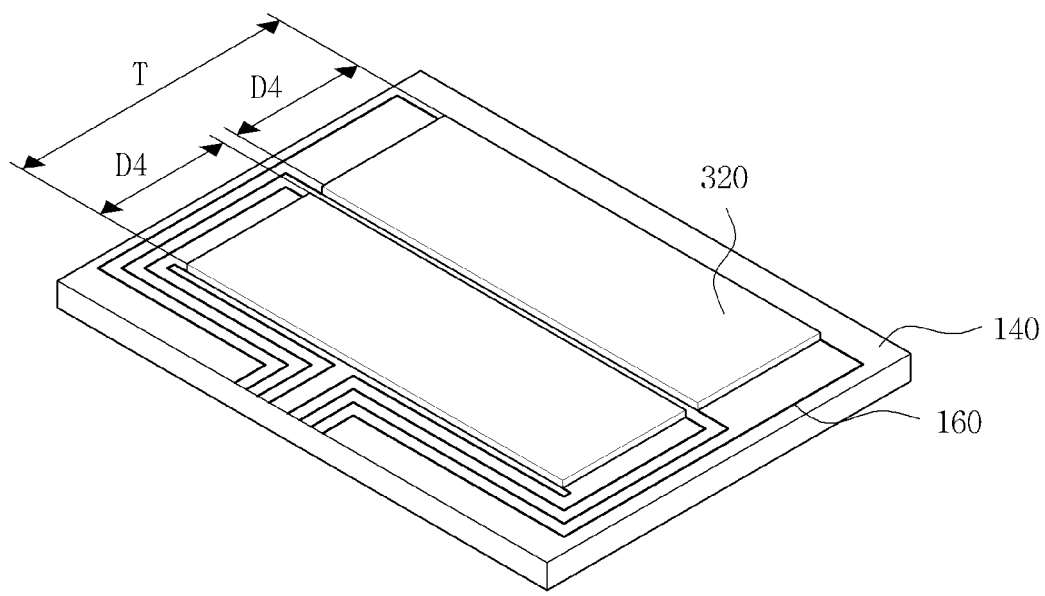
FIGS. 12 and 13 are perspective views of second transparent substrates according to a third embodiment of the present invention.
Figure 13:
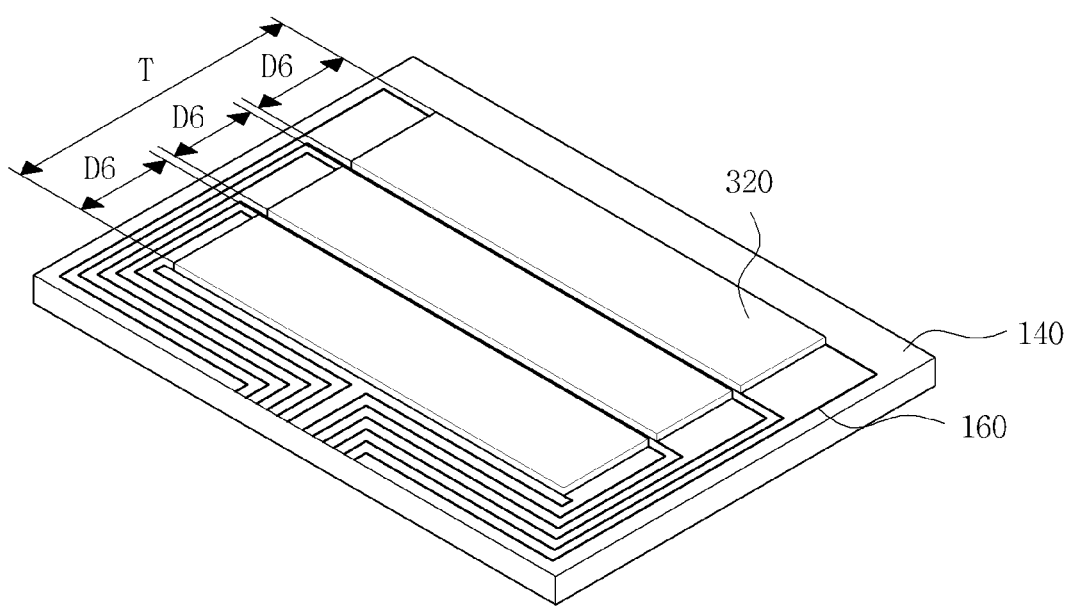

FIG. 8 is an exploded perspective view of a touch panel according to a third to embodiment of the present invention, FIG. 9 is a side view of a touch panel according to a third embodiment of the present invention, FIGS. 10 and 11 are perspective views of first transparent substrates according to a third embodiment of the present invention, and FIGS. 12 and 13 are perspective views of second transparent substrates according to a third embodiment of the present invention.

As shown in FIGS. 8 to 13, the touch panel 300 according to this embodiment includes: a first transparent substrate 110; a first integrated transparent electrode 310 formed on the first transparent substrate 110 and divided in a length direction (L); first wiring 130 whose one set of ends are connected to the first integrated transparent electrode 31 and whose the other set of ends are arranged on one side of the first transparent substrate 110; a second transparent substrate 140; a second integrated transparent electrode 320 formed on the second transparent substrate 140 and divided in a thickness direction (T); second wiring 160 whose one set of ends are connected to the second integrated transparent electrode 320 and whose the other set of ends are arranged on one side of the second transparent substrate 140; and an adhesive layer 170 disposed between the first integrated transparent electrode 310 and the second integrated transparent electrode 320 such that the first integrated transparent electrode 310 and the second integrated transparent electrode 320 face each other.

The touch panel 300 according to this embodiment is different from the touch panel according to the above first embodiment in the shapes of electrodes (bar-shaped transparent electrodes and integrated transparent electrodes). Therefore, only the first integrated transparent electrode 310 and the second integrated transparent electrode 320 will be described, and the description of other constituents will be omitted.

The first integrated transparent electrode 310, unlike the above first embodiment, is formed in an integrated shape, not in a bar shape. However, the first integrated transparent electrode 310, like the first bar-shaped transparent electrode 120 according to the above first embodiment, is also divided in a length direction (L) in order to decrease its resistance (refer to FIGS. 10 and 11). In this case, the first integrated transparent electrode 310 may be divided into two equal parts, each having a length of D3, in order to allow the first integrated transparent electrode 310 to realize constant resistance (refer to FIG. 10). In order to further decrease the resistance, the first integrated transparent electrode 310 may be divided into three equal parts, each having a length of D5 (refer to FIG. 11).

The second integrated transparent electrode 320 is divided in a thickness direction (T) (refer to FIGS. 12 and 13). Therefore, the second integrated transparent electrode 320 and the first integrated transparent electrode 310 facing each other are perpendicular to each other. The second integrated transparent electrode 320, similarly to the first integrated transparent electrode 310, may be divided into two equal parts, each having a length of D4 (refer to FIG. 12). In order to further decrease the resistance, the second integrated transparent electrode 320 may be divided into three equal parts, each having a length of D6 (refer to FIG. 13).

Further, the first integrated transparent electrode 310 and the second integrated transparent electrode 320, like the first bar-shaped transparent electrode 120 according to the first embodiment, may be made of a conductive polymer or may be made of a combination of a conductive polymer and a carbon material. Here, examples of the conductive polymer include poly-3,4-ethylenedioxythiophene/polystyrene sulfonate (PEDOT/PSS), polyaniline, polyacetylene, and polyphenylenevinylene, and examples of the carbon material include carbon black, carbon nanotubes, and graphene.

As described above, according to the touch panel of the present invention, since transparent electrodes are divided, low resistance can be realized even when the transparent electrodes are made of a conductive polymer, thus keeping up with the trend of manufacturing large touch panels.

Although the preferred embodiments of the present invention have been disclosed for illustrative purposes, those skilled in the art will appreciate that various modifications, additions and substitutions are possible, without departing from the scope and spirit of the to invention as disclosed in the accompanying claims. Simple modifications, additions and substitutions of the present invention belong to the scope of the present invention, and the specific scope of the present invention will be clearly defined by the appended claims.

What is claimed is:
1. A mutual capacitive touch panel, comprising:
a first transparent substrate;
a first bar-shaped transparent electrode formed on the first transparent substrate and divided into at least two parts in a length direction;
first wiring whose one set of ends are connected to the first bar-shaped transparent electrode and whose the other set of ends are arranged on one side of the first transparent substrate;
a second transparent substrate;
a second bar-shaped transparent electrode formed on the second transparent substrate and divided into at least two parts in a length direction;
second wiring whose one set of ends are connected to the second bar-shaped transparent electrode and whose the other set of ends are arranged on one side of the second transparent substrate; and
an adhesive layer disposed between the first bar-shaped transparent electrode and the second bar-shaped transparent electrode such that the first bar-shaped transparent electrode and the second bar-shaped transparent electrode face each other,
transparent electrode divided into at least two parts in the length direction is identical, and each length of the second bar-shaped transparent electrode divided into at least two parts in the length direction is identical.

2. The mutual capacitive touch panel according to claim 1, wherein the first bar-shaped transparent electrode or the second bar-shaped transparent electrode is divided into two equal parts.

3. The mutual capacitive touch panel according to claim 1, wherein the first bar-shaped transparent electrode and the second bar-shaped transparent electrode are perpendicular to each other.

4. The mutual capacitive touch panel according to claim 1, wherein the first bar-shaped transparent electrode or the second bar-shaped transparent electrode is made of a conductive polymer.

5. The mutual capacitive touch panel according to claim 1, wherein the first bar-shaped transparent electrode or the second bar-shaped transparent electrode is made of a combination of a conductive polymer and a carbon material.

6. The mutual capacitive touch panel according to claim 5, wherein the carbon material is selected from among carbon black, carbon nanotubes, and graphene.

7. A mutual capacitive touch panel, comprising:
a first transparent substrate;
a first integrated transparent electrode formed on the first transparent substrate and divided into at least two parts in a length direction;
first wiring whose one set of ends are connected to the first integrated transparent electrode and whose other ends are arranged on one side of the first transparent substrate;
a second transparent substrate;
a second integrated transparent electrode formed on the second transparent substrate and divided into at least two parts in a thickness direction;
second wiring whose one set of ends are connected to the second integrated transparent electrode and whose the other set of ends are arranged on one side of the second transparent substrate; and
an adhesive layer disposed between the first integrated transparent electrode and the second integrated transparent electrode such that the first integrated transparent electrode and the second integrated transparent electrode face each other,
wherein each length of the divided first integrated transparent electrode divided into at least two parts is identical in the length direction and each length of the divided second integrated transparent electrode divided into at least two parts is identical in the length direction.

8. The mutual capacitive touch panel according to claim 7, wherein the first integrated transparent electrode or the second integrated transparent electrode is divided into two equal parts.

9. The mutual capacitive touch panel according to claim 7, wherein the first integrated. transparent electrode or the second integrated transparent electrode is divided into three equal parts.

10. The mutual capacitive touch panel according to claim 7, wherein the first integrated transparent electrode and the second integrated transparent electrode are perpendicular to each other.

11. The mutual capacitive touch panel according to claim 7, wherein the first integrated transparent electrode or the second integrated transparent electrode is made of a conductive polymer.

12. The mutual capacitive touch panel according to claim 7, wherein the first integrated transparent electrode or the second integrated transparent electrode is made of a combination of a conductive polymer and a carbon material.

13. The mutual capacitive touch panel according to claim 12, wherein the carbon material is selected from among carbon black, carbon nanotubes, and graphene.

* * * * *